May 25, 1954
C. N. JOHNSON ET AL
2,679,200
ROTOR BLADE FOR ROTARY CULTIVATORS
Filed Nov. 30, 1950
2 Sheets-Sheet 1
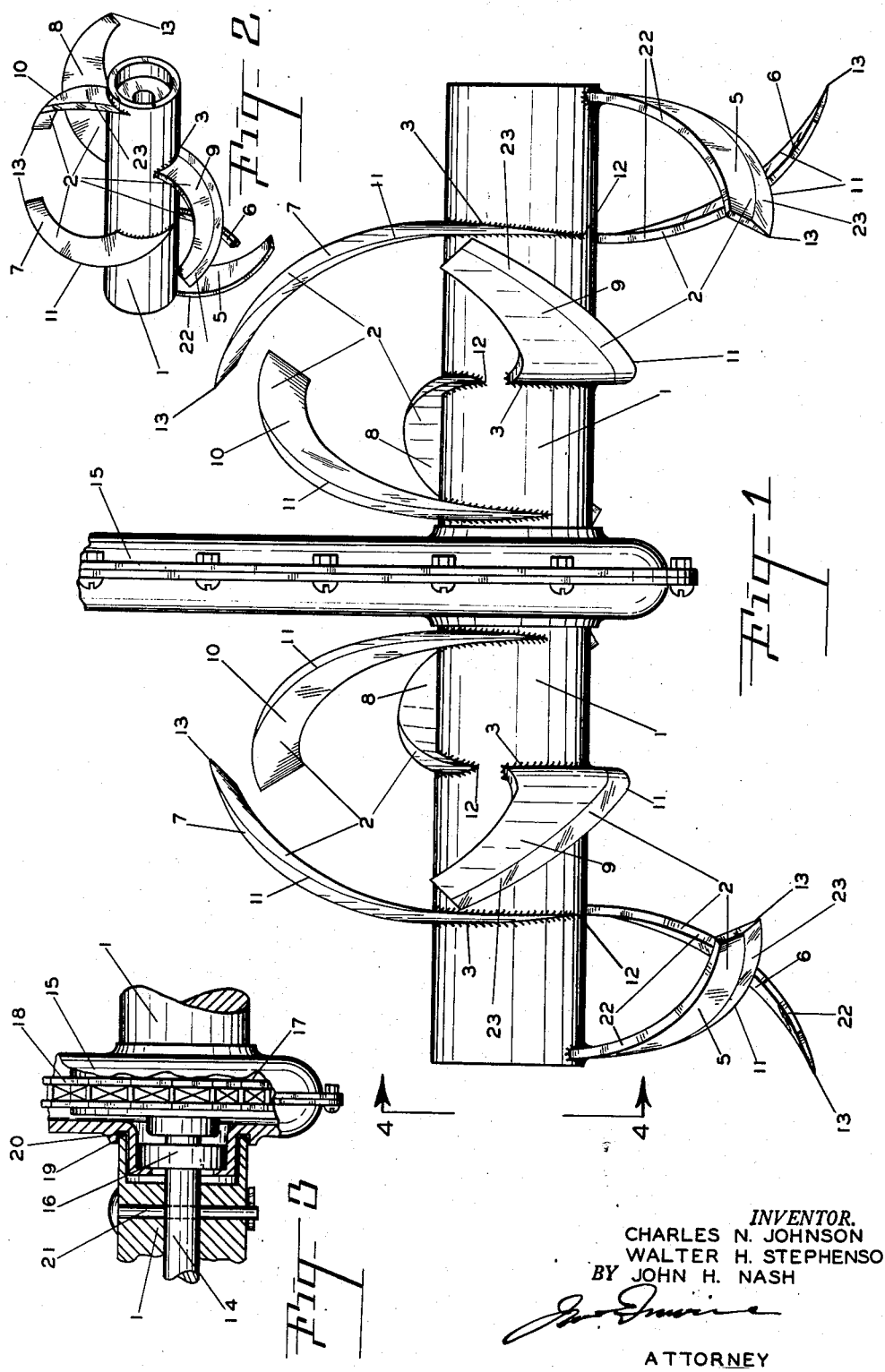
INVENTOR.
CHARLES N. JOHNSON
WALTER H. STEPHENSON
BY JOHN H. NASH
ATTORNEY

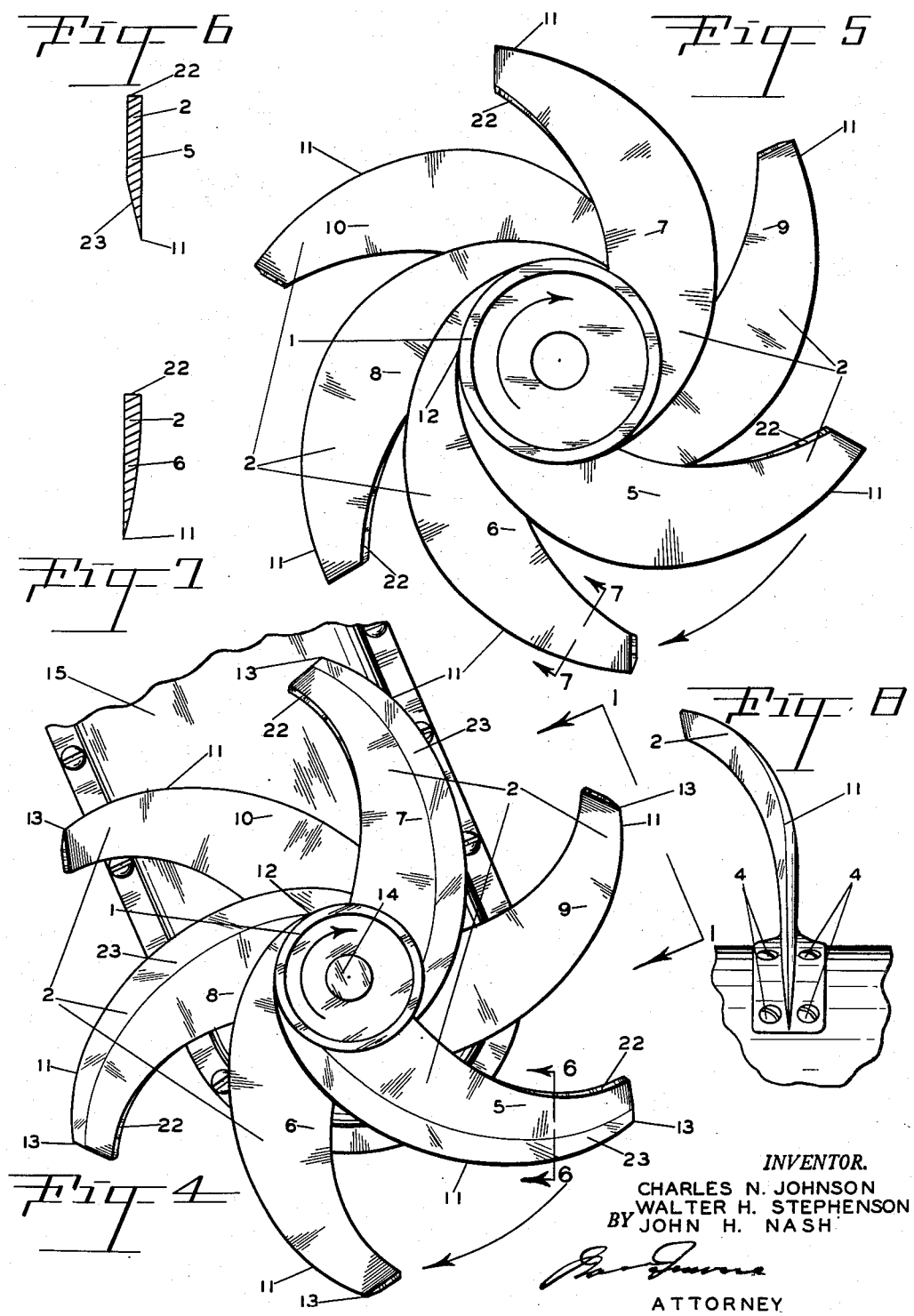

Patented May 25, 1954

2,679,200

UNITED STATES PATENT OFFICE 2,679,200

ROTOR BLADE FOR ROTARY CULTIVATORS

Charles N. Johnson, Walter H. Stephenson, and John H. Nash, Portland, Oreg.

Application November 30, 1950, Serial No. 198,414

1 Claim. (Cl. 97—215)

This invention relates to improvements in rotor blades for rotary cultivators and is particularly adapted to be used on rotary cultivators already in existence.

The primary object of this invention is to mount cultivator blades on to rotors for rotary cultivators that are so shaped and designed that they will forcefully move clods of dirt back and forth between the said blades, breaking the clods in this operation.

A further object of the invention is the mounting of special designed and shaped blades to hubs of rotors that will not become clogged with grass, weeds and the like in the operation of the cultivator.

In order to carry out the above objects, the cutting edges of the blades are shaped in the form of involute curves starting from a relatively large diameter hub. The cutting edges are also curved in an approximate parabola line axially with the hub, starting at the hub parallel with the direction of rotation and gradually increasing at an angle to the tips of the blades until a line drawn tangent to the tip of the blade would be approximately parallel to the center line of the hub.

By spacing the blades on the hub, and having the cutting edges facing towards one another, the shape of the blades will throw the dirt and clods back and forth therebetween in high speed rotation, breaking up the clods. By having a hub of relatively large diameter and the cutting edge of the blade extending from the hub in an approximate involute curve, weeds, grass and other foreign matter will not wrap around the rotor, which has been a serious objection to high speed cultivating rotors.

These and other incidental objects will be apparent in the drawings, specification and claim.

Referring to the drawings:

Figure 1 is a side view of a pair of rotor cultivator units applied to a typical driving head. This view is taken on line 1—1 of Figure 4.

Figure 2 is a perspective side and end view of the cultivator rotor removed from the driving shaft of the head.

Figure 3 is an enlarged detail partially broken away view, of the driving head and hub assembly as looking into Figure 1.

Figure 4 is an end view of the rotor, taken on line 4—4 of Figure 1.

Figure 5 is another preferred form of rotor wherein the cutting edges of the blades are shaped in the form of involute curves.

Figure 6 is a fragmentary sectional detail view of one of the blades, taken on line 6—6 of Figure 4.

Figure 7 is a fragmentary sectional view, taken on line 7—7 of Figure 5, showing a slight modified form of cross section.

Figure 8 illustrates how the blades may be removably mounted to the hub.

Referring more specifically to the drawings:

Our new and improved cultivator rotor consists of a relatively large hub 1 of tubular design. Cultivator blades 2 are fixedly or removably secured to the hub 1, as for instance by welding at 3 or by bolts or screws 4, referring to Figures 1 and 8.

In order to better explain the construction of the rotor we are giving each blade a separate reference numeral. Starting from the outer ends of the rotors, the blades are numbered from 5 to 10 inclusive.

Referring to Figure 1, the blades 5 tend to throw the clods of dirt to the right in regards to the blade 6, each blade throwing the clods towards one another. This also is true of the blades 7 and 9 and between the blades 8 and 10. Under high speed rotation this action pulverizes the soil by throwing the soil back and forth between the above mentioned pairs of blades.

Due to the fact that the cutting edges 11 of the blades start at a tangent at 12 from the hub 1 and gradually following an approximate line of an involute curve to their tips 13, weeds, vines and other foreign matter will not clog or wrap about the hub as there are no sharp corners or abrupt angles relative to the direction of travel of the cutting edge in regards to the long fibrous materials encountered, but rather a shearing cut is exerted against such materials cutting them into short pieces and mixing them into the soil being cultivated.

We do not wish to be limited to a cutting edge resembling a perfect involute curve, as the blades illustrated in Figures 1 and 4 are not true involute curves, while the blades shown in Figure 5 are involute curves except to a slight portion adjacent the hub which has to be filled in from an involute in order to enter the hub at a tangent.

One of the main features of the construction of the rotor is that the hub should be made relatively large in diameter. It has been found that this helps to avoid any wrapping of the foreign fibers around the hub.

These blades may be welded to the hub as illustrated in Figures 1, 2 and 4, but in Figure 8 we illustrate how the blades could be mounted so they can be removed and replaced.

In Figures 1, 2, 3 and 4, we illustrate a hub or rotor that is adapted to fit to a shaft 14 extending from a housing 15, the said shaft being journalled within bearings 16 and having a sprocket 17 keyed thereto and driven by a chain 18. This is only to illustrate one form of mounting of the rotor.

It is desirable to have the end 19 of the rotor working within a groove 20 formed on the housing 15, preventing weeds or foreign matter from getting into the bearings. The rotor can be easily keyed to the shaft as by the key 21.

We do not wish to be limited to the method of mounting the rotor but have merely illustrated this method which is common to many well known cultivators of today.

It is desirable to have the cutting edge 11 of the blades at a greater distance from the hub than the trailing edge 22 adjacent the tips of the blades. This provides a turning effect to the soil other than just shearing through the soil similar to the mold board of a plow, thereby assisting greatly in the pulverizing of the soil, this ratio of distances increasing towards the tip of the blades.

In Figure 6 we illustrate a section through the blade wherein the blades are sharpened by way of bevel portions 23. In Figure 7 we illustrate how the blades can taper from their trailing edges 22 and their cutting edge 11. Either method works well with our new and improved rotors.

What we claim is:

A rotor unit for rotary cultivators, comprising a rotatable cylindrical hub having a plurality of blades extending therefrom, each of said blades having an outer cutting edge which substantially defines a portion of an involute curve generated from the hub circle in the direction opposite the direction of hub rotation, said outer edge adjacent the hub extending substantially tangentially to the periphery of the hub, the cutting edge of each blade being at a greater distance from the hub than the trailing edge of each blade adjacent the tip thereof, each of said blades being curved axially of the hub and starting at the hub parallel with the direction of rotation of the hub and gradually increasing at an angle thereto to the tip of each blade until a line drawn tangent to the tip is approximately parallel to the axis of the hub, the blades being spaced apart in staggered relation about the hub and curved axially alternately in opposite directions, whereby the axial curvature of the blades causes turning of the soil as it is cut by the cutting edges to assist in pulverizing of the ground and the involute and tangential curvature of the cutting edges relative to the hub preclude sharp angles in the direction of travel of the cutting edges and prevent clogging and wrapping of vines, weeds and other foreign matter about the hub and blades.

References Cited in the file of this patent

UNITED STATES PATENTS

| Number | Name | Date |
| --- | --- | --- |
| 503,006 | Sexsan | Aug. 8, 1893 |
| 977,911 | Watt | Dec. 6, 1910 |
| 1,456,860 | Turner | May 29, 1923 |
| 1,532,986 | Branson | Apr. 7, 1925 |
| 2,502,094 | Kelsey | Mar. 28, 1950 |

FOREIGN PATENTS

| Number | Country | Date |
| --- | --- | --- |
| 50,632 | Germany | Feb. 3, 1890 |
| 516,114 | Germany | Jan. 19, 1931 |